(12) United States Patent
Li et al.

(10) Patent No.: US 11,187,514 B2
(45) Date of Patent: Nov. 30, 2021

(54) CAPACITANCE-GRATING TYPE DIGITAL DISPLAY MEASURING TAPE

(71) Applicant: GUILIN GEMRED SENSOR TECHNOLOGY Co., Ltd., Guangxi (CN)

(72) Inventors: Guangjin Li, Guangxi (CN); Ye Chen, Guangxi (CN); Yue Wu, Guangxi (CN); Guanglu Yang, Guangxi (CN); Xiamei Wen, Guangxi (CN); Hui Lu, Guangxi (CN); Wen'ai Li, Guangxi (CN)

(73) Assignee: GUILIN GEMRED SENSOR TECHNOLOGY CO., LTD., Guangxi (CN)

( * ) Notice: Subject to any disclaimer, the term of this patent is extended or adjusted under 35 U.S.C. 154(b) by 93 days.

(21) Appl. No.: 16/639,296

(22) PCT Filed: Oct. 23, 2018

(86) PCT No.: PCT/CN2018/111316
§ 371 (c)(1),
(2) Date: Feb. 14, 2020

(87) PCT Pub. No.: WO2019/100883
PCT Pub. Date: May 31, 2019

(65) Prior Publication Data
US 2020/0256657 A1    Aug. 13, 2020

(30) Foreign Application Priority Data

Nov. 22, 2017    (CN) .......................... 201711173101.9
Nov. 22, 2017    (CN) .......................... 201721573283.4

(51) Int. Cl.
*G01B 3/10*    (2020.01)
*G01B 3/1069*    (2020.01)

(52) U.S. Cl.
CPC .................................. *G01B 3/1069* (2020.01)

(58) Field of Classification Search
CPC ..................................................... G01B 3/1069
(Continued)

(56) References Cited

U.S. PATENT DOCUMENTS 4,551,847 A * 11/1985 Caldwell ................ G01D 5/363
377/24
5,426,863 A * 6/1995 Biggel ................. G01B 3/1061
33/763
(Continued)

FOREIGN PATENT DOCUMENTS

CN    2328982 Y    7/1999
CN    2362096 Y    2/2000
(Continued)

*Primary Examiner* — George B Bennett
(74) *Attorney, Agent, or Firm* — Craft Chu PLLC; Andrew W. Chu

(57) ABSTRACT

The capacitance-grating type digital display measuring tape includes a shell, a tape box, a tape body and a capacitance-grating sensor. A rotatable central shaft is disposed in the shell in an axial direction thereof. The tape box is mounted at one side in the shell close to the back side in the shell by the central shaft. A mainspring configured to pre-tighten the tape box is disposed in the tape box. The tape body is wound and collected in a groove in the outer circumference of the tape box. The capacitance-grating sensor is located in a position close to the front side in the shell. A self-adjusting mechanism is disposed at a position, corresponding to the outlet, on the inner wall of the shell. The self-adjusting mechanism automatically adjusts the speed at which the tape body extends out of or retracts into the shell.

10 Claims, 3 Drawing Sheets

(58) Field of Classification Search
USPC .................................. 33/755, 759, 760, 762
See application file for complete search history.

(56) References Cited

U.S. PATENT DOCUMENTS

| | | | | |
|---|---|---|---|---|
| 5,433,014 | A * | 7/1995 | Falk | G01B 3/1084 |
| | | | | 33/763 |
| 5,894,678 | A * | 4/1999 | Masreliez | G01B 7/026 |
| | | | | 33/762 |
| 2014/0101948 | A1* | 4/2014 | Lee | G01B 3/10 |
| | | | | 33/2 R |
| 2015/0308807 | A1* | 10/2015 | Rhoden | G01B 3/1061 |
| | | | | 33/763 |
| 2019/0257633 | A1* | 8/2019 | Levisohn | G01B 3/1061 |
| 2020/0208954 | A1* | 7/2020 | Koike | G01B 3/1056 |

FOREIGN PATENT DOCUMENTS

| | | |
|---|---|---|
| CN | 2672613 Y | 1/2005 |
| CN | 107843165 A | 3/2018 |
| CN | 207472145 A | 6/2018 |

\* cited by examiner

CAPACITANCE-GRATING TYPE DIGITAL DISPLAY MEASURING TAPE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of measurement instruments, and more particularly, to a capacitance-grating type digital display measuring tape.

2. Description of Related Art Including Information Disclosed Under 37 CFR 1.97 and 37 CFR 1.98

With the development of modern electronic technology, the length measurement gradually realizes digitalization and intelligence. Hall sensors, photoelectric sensors, and capacitance-grating sensors are widely used in the field of digital display measuring tapes. The capacitance-grating sensors are more worthy of promotion due to their low power consumption.

The Chinese utility model patent with the patent number 201220739071.X discloses a digital display measuring tape, which is provided with a laser irradiator thereon and thus causes great power consumption. The accuracy of such patent product depends on the distance between two points of through holes which are disposed and evenly distributed in the tape and perpendicular to a length direction of the tape. If the distance between the small holes is 5 mm, then the measurement accuracy is 10 mm. If the small holes are too dense, the machining difficulty will be increased. Therefore, the accuracy of such measuring tape will be severely restricted.

The Chinese utility model patent with the patent number 200320102400.0 discloses a capacitance-grating type digital display measuring tape, which uses a two-piece type capacitance-grating sensor to realize a measuring function of the tape length by measuring a rotation angle. The two-piece type capacitance-grating sensor has higher requirements on the coaxiality of the sensor structure, otherwise the measurement accuracy of the capacitance-grating sensor cannot be guaranteed. In the first embodiment, the capacitance-grating sensor is coaxial with a mainspring box. A rotation angle of the mainspring box detected by the capacitance-grating sensor is directly converted into a display code by a single-chip microcomputer and input to a display to complete the measurement of the tape length. In this embodiment, it is never considered that the circumference of each circle wound by the tape is inconsistent (the outer circle is larger while the inner circle is smaller). The larger the measurement range of the product is, the more the number of winding turns is, and the larger the deviation value is, thereby directly affecting the measurement accuracy of the capacitance-grating type digital display measuring tape. Such a coaxial structure cannot guarantee the winding consistency of the tape, and the inconsistency in the winding tightness affects the repeatability and reliability of the measurement result. In the second embodiment, the capacitance-grating sensor is mounted on a toothed rotating wheel, and the tape is provided with equidistant circular holes to cooperate with a gear for rotation, such that the tape of such a structure is more difficult to be machined. The machining accuracy of the circular holes in the tape directly affects the measurement accuracy. Besides, this structure is not suitable for the tapes of various types (for example, a wire tape).

BRIEF SUMMARY OF THE INVENTION

In summary, in order to overcome the shortcomings of the prior art, the technical problem to be solved by the present invention is to provide a capacitance-grating type digital display measuring tape.

The technical solution of the present invention to solve the above technical problems is as follows: a capacitance-grating type digital display measuring tape includes a shell, a tape box, a tape body, a capacitance-grating sensor and a single-chip microcomputer, wherein a rotatable central shaft is disposed in the shell in an axial direction thereof; the tape box is coaxially and fixedly connected to a position, corresponding to the back side in the shell, on the central shaft, and a mainspring configured to pre-tighten the tape box is disposed in the tape box; the tape body is wound and collected in a groove in the outer circumference of the tape box, and one end of the tape body extends to the outside through an outlet in the side wall of the shell; the capacitance-grating sensor is located in a position close to the front side in the shell, and the capacitance-grating sensor and the tape box are coaxially disposed to measure a rotation angle of the tape box; the single-chip microcomputer is located on the capacitance-grating sensor and configured to obtain a measurement length of the tape body according to the rotation angle measured by the capacitance-grating sensor, and a display screen configured to display the measurement length obtained by the capacitance-grating sensor is disposed on the front of the shell; a moving grating of the capacitance-grating sensor is fixed on the central shaft fixedly connected to the tape box; and a self-adjusting mechanism configured to adjust a speed at which the tape body extends out of the shell or retracts into the shell is disposed at a position, corresponding to the outlet, on the inner wall of the shell.

The present invention has the following beneficial effect: the moving grating of the capacitance-grating sensor is fixed on the central shaft fixedly connected to the tape box, and rotates along with the tape box, thereby ensuring that the capacitance-grating sensor can reliably measure the pulling change of the tape body and improving the reliability and long-term stability of the measurement. The self-adjusting mechanism automatically adjusts the speed at which the tape body extends out of or retracts into the shell, thereby preventing the measurement result from being affected since the response speed of the capacity grating sensor lags caused by the fact that the tape body extends outs of or retracts into the shell too fast.

On the basis of the above technical solution, the present invention can also be improved as follows:

Further, a length value corresponding to the expansion of the tape body is measured at every N pitch angles in a factory calibration manner, and every N pitch angles of the capacitance-grating sensor and the expansion length values of the tape body are stored into the single-chip microcomputer in a form of one-to-one correspondence, so as to form an electronic digital scale of the tape body in the single-chip microcomputer.

The beneficial effect of adopting the above further technical solution is to overcome the accuracy error caused by the inconsistency of the winding circumference of each circle of the tape body.

Further, the single-chip microcomputer compares a memory of a zero position within an initial position pitch of the capacitance-grating sensor with a current position of the tape body, to realize a self-checking function of checking whether the tape body is returned to zero, and displays a detection result by the display screen.

The beneficial effect of adopting the above further technical solution is to judge whether the tape body is returned to zero, and ensure the measurement accuracy.

Further, the self-adjusting mechanism includes a rotary pin and a speed limiting rod; the rotary pin is located at a corresponding position on the inner wall of the shell; the middle portion of the speed limiting rod is rotatably mounted on the rotary pin; and one end of the speed limiting rod abuts against the outer periphery of the tape box, and the other end of the speed limiting rod extends obliquely and then abuts against a portion of the tape body between the tape box and the outlet.

The beneficial effect of adopting the above further solution is that the rotary pin and the speed limiting rod form a lever mechanism, which uses a lever principle to control the retracting speed of the tape body.

Further, the capacitance-grating type digital display measuring tape further includes a mainspring pre-tightening disc which rotates to pre-tighten the tape box by the mainspring during assembling of the measuring tape, and the mainspring pre-tightening disc is located at a position, corresponding to the inside of the tape box, on the end portion of the central shaft; the mainspring is located between the mainspring pre-tightening disc and the tape box; one end of the mainspring is fixed on the outer periphery of the mainspring pre-tightening disc, and the other end of the mainspring is fixed on the inner periphery of the tape box; and the mainspring pre-tightening disc is further provided with a reserved hole for positioning the mainspring pre-tightening disc after the tape box is pre-tightened by the mainspring.

The beneficial effect of adopting the above further solution is that, by disposing the mainspring pre-tightening disc structure, the pre-tightening of the mainspring is not affected by the shell structure, and the assembly efficiency can be improved.

Further, a first ball bearing is disposed between the mainspring pre-tightening disc and the end portion of the central shaft.

Further, the capacitance-grating sensor further includes a transmitting board and a receiving function board; the transmitting board, the moving grating and the receiving function board are sequentially located at positions of the central shaft away from one end of the tape box in a direction from the inside to the outside of the shell, and the transmitting board, the moving grating and the receiving function are disposed coaxial with the tape box; a second ball bearing is disposed between the transmitting board and the central shaft; the moving grating is fixed on the central shaft and rotates synchronously with the central shaft, and the receiving function board is fixed on the inner wall of the front of the shell; the display screen is mounted on the receiving function board; and the receiving function board is further provided with the single-chip microcomputer and buttons which extend out of the shell and are configured to select a measuring mode.

The beneficial effect of adopting the above further solution is that the capacitance-grating sensor is of a three-piece type structure formed by the transmitting board, the moving grating and the receiving function board. Compared with the two-piece type capacitance-grating sensor, the assembling difficulty is reduced and the production efficiency is improved. The single-chip microcomputer is configured to store calibration data, and solve a length of the tape body corresponding to each fixed angle according to the rotation angle of the tape box measured by the capacitance-grating sensor, thereby solving the measurement length of the tape body. The rotary structure of double ball bearings, that is, the first ball bearing and the second ball bearing, is adopted, to reduce the rotation friction force of the tape box and to control the rotation stability of the tape box.

Further, the buttons include an accumulative measurement button, and the accumulating measurement button controls the next measurement by the single-chip microcomputer and takes the last measurement as a starting point to accumulate multiple measurements and obtain a measured value.

The beneficial effect of adopting the above further technical solution is to expand the measurement range of the digital display measuring tape.

Further, the shell includes a front cover, a support seat, and a rear cover; the front cover and the rear cover are disposed front and back at an interval; and the support seat is located between the front cover and the rear cover and connects the two.

Further, the tape body is a steel tape, a PVC plastic fiber tape or a flexible wire tape.

Figure 1:
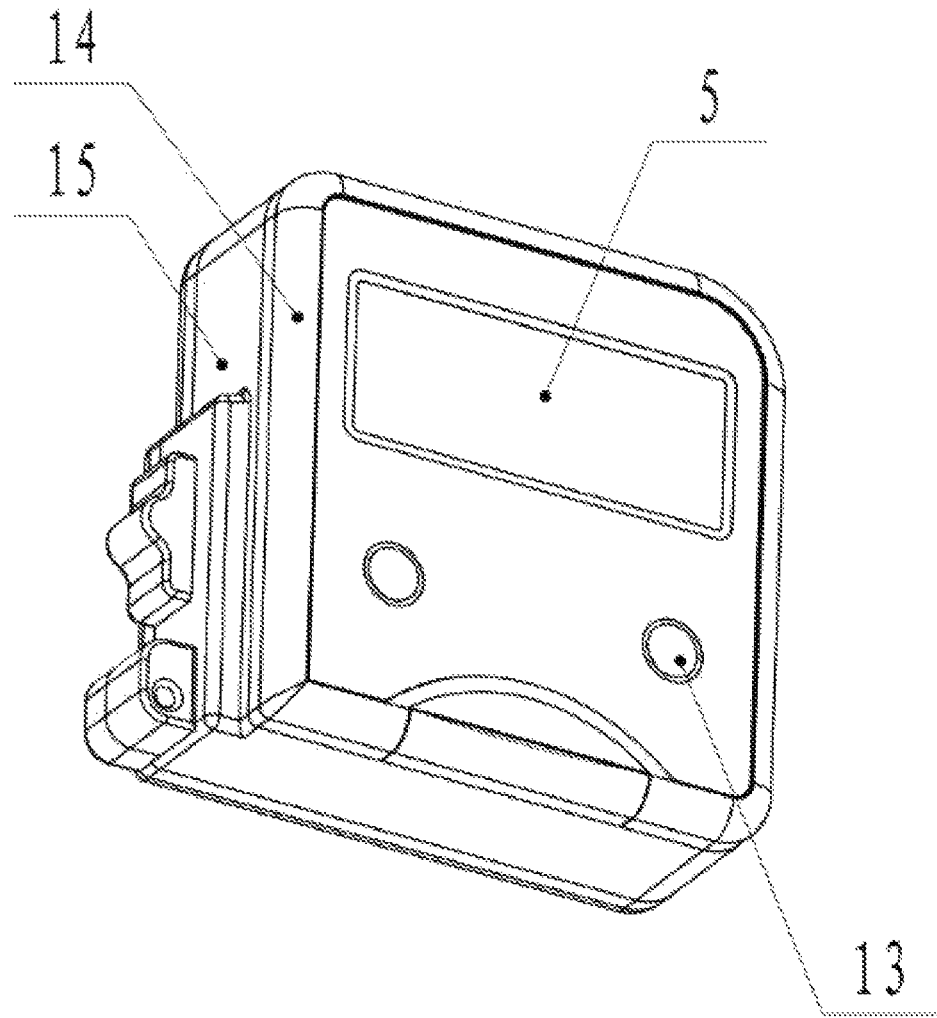
FIG. 1 is a schematic view of a three-dimensional structural diagram of the present invention.

In the drawings, the list of components represented by respective reference signs is as follows:

1, tape box; 2, tape body; 3, central shaft; 4, mainspring; 5, display screen; 6, rotary pin; 7, adjusting rod; 8, mainspring pre-tightening box; 9, first ball bearing; 10, transmitting board; 11, moving grating; 12, receiving function board; 13, buttons; 14, front cover; 15, support seat; 16, rear cover; 17, second ball bearing.

DETAILED DESCRIPTION OF THE INVENTION

The principles and features of the present invention are described below with reference to the accompanying drawings. The examples given are merely configured to explain the present invention and are not intended to limit the scope of the present invention.

Figure 2:
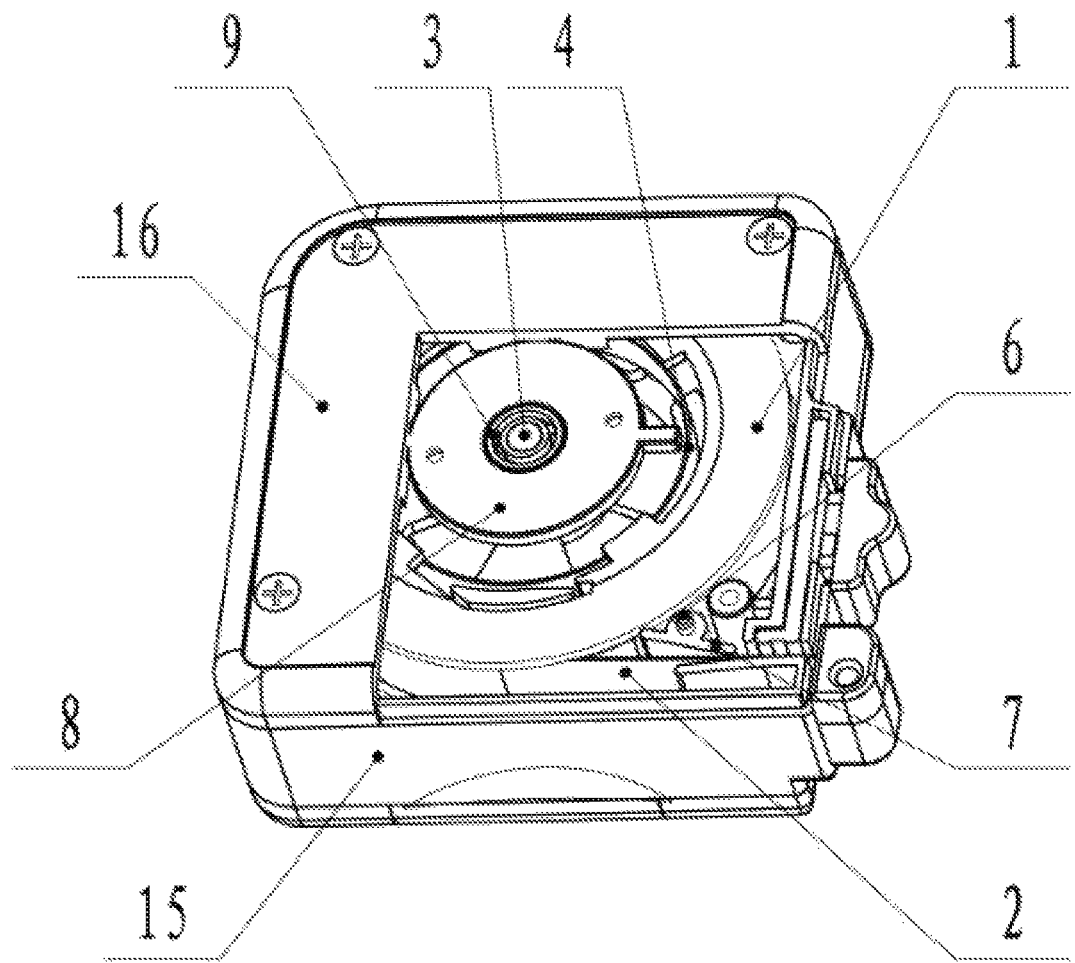
FIG. 2 is a partial cross-sectional view of a rear cover of the present invention.
Figure 3:
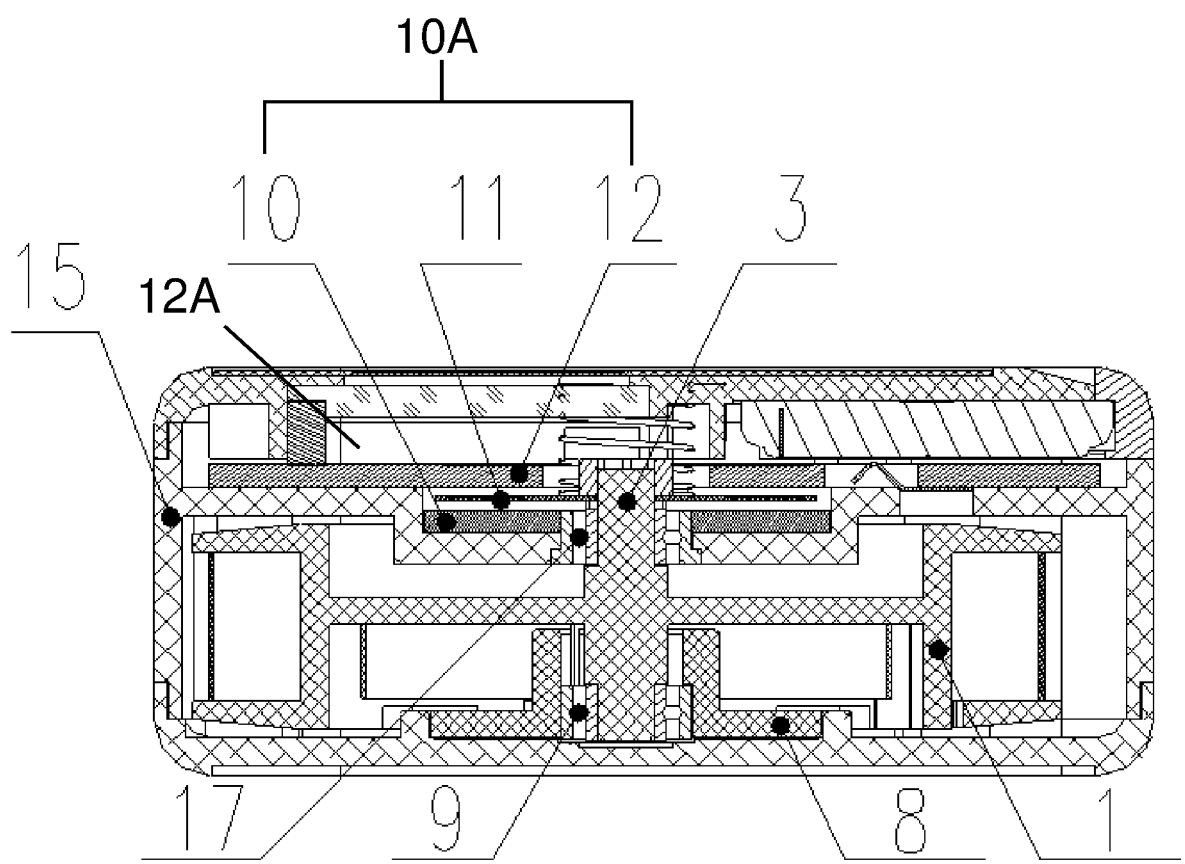
FIG. 3 is a sectional view of the present invention.

As shown in FIGS. 1-3, a capacitance-grating type digital display measuring tape includes a shell, a tape box 1, a tape body 2, a capacitance-grating sensor, and a single-chip microcomputer. The shell includes a front cover 14, a support seat 15, and a rear cover 16. The front cover 14 and the rear cover 16 are disposed front and back at an interval, and the support seat 15 is located between the front cover 14 and the rear cover 16 and connects the two. A rotatable central shaft 3 is disposed in the shell in an axial direction thereof. The tape box 1 is coaxially and fixedly connected to a position, corresponding to the rear side in the shell, on the central shaft 3. A mainspring 4 configured to pre-tighten the tape box 1 is disposed in the tape box 1. The tape body 2 is wound and collected in a groove in the outer circumference of the tape box 1, and one end of the tape body 2 extends to the outside through an outlet in the side wall of the shell. The tape body 2 is a steel tape, a PVC plastic fiber tape or a flexible wire tape. The capacitance-grating sensor is located at a position in the shell close to the front side, and the capacitance-grating sensor and the tape box 1 are coaxially disposed to measure a rotation angle of the tape box 1. The single-chip microcomputer is located on the capacitance-grating sensor and configured to obtain a measurement length of the tape body 2 according to the rotation angle measured by the capacitance-grating sensor. A display screen 5 configured to display a measurement length obtained by the capacitance-grating sensor is disposed on the front of the shell. A self-adjusting mechanism configured to adjust a speed at which the tape body 2 extends out of the shell or retracts into the shell is disposed at a position, corresponding to the outlet, on the inner wall of the shell. The self-adjusting mechanism includes a rotary pin 6 and a speed limiting rod 7. The rotary pin 6 is located at a corresponding position on the inner wall of the shell. The middle portion of the speed limiting rod 7 is rotatably mounted on the rotary pin 6. One end of the speed limiting rod 7 abuts against the outer periphery of the tape box 1, and the other end of the speed limiting rod 7 extends obliquely and then abuts against a portion of the tape body 2 between the tape box 1 and the outlet. The rotary pin 6 and the speed limiting rod 7 form a lever mechanism. When the tape body 2 is stretched, the speed limiting rod 7 rotates counterclockwise along the rotary pin 6 under the action of a stretching force (referring to FIG. 2). At this point, one end of the speed limiting rod 6 is separated from the outer periphery of the tape box 1 to achieve a releasing effect without affecting the stretching of the tape body 2. When the tape body retracts, the tape box 1 rotates clockwise under the retracting force of the mainspring 4, and the speed limiting rod 7 rotates counterclockwise along the rotary pin 6 (referring to FIG. 2). At this point, one end of the speed limiting rod 7 will abut against the outer periphery of the tape box 1 to achieve a clamping effect. Under the action of a friction force between the speed limiting rod 6 and the outer periphery of the tape box 1, the retracting speed of the tape body 2 can be controlled. The lever principle is configured to control the retracting speed of the tape body 2, thereby preventing the measurement result from being affected since the response speed of the capacity grating sensor lags caused by the fact that the tape body 2 extends outs of or retracts into the shell too fast.

The capacitance-grating type digital display measuring tape also includes a mainspring pre-tightening disc 8 which rotates to pre-tighten the tape box 1 by the mainspring 4 during assembling of the measuring tape. The mainspring pre-tightening disc 8 is located at a position, corresponding to the inside of the tape box 1, on the end portion of the central shaft 3. A first ball bearing 9 is disposed between the mainspring pre-tightening disc 8 and the end portion of the central shaft 3. The mainspring 4 is located between the mainspring pre-tightening disc 8 and the tape box 1, one end of the mainspring 4 is fixed on the outer periphery of the mainspring pre-tightening disc 8, and the other end of the mainspring 4 is fixed on the inner periphery of the tape box 1. The mainspring pre-tightening disc 8 is further provided with a reserved hole for positioning the tape box 1 after the tape box 1 is pre-tightened by the mainspring 4. By disposing the structure of the mainspring pre-tightening disc 8, the fixed end of the mainspring 4 is mounted on the mainspring pre-tightening disc 8 at first, the mainspring 4 is pre-tightened by rotating the mainspring pre-tightening disc 8, and then the mainspring pre-tightening disc 8 is pre-positioned by a reserved process hole, i.e., the reserved hole in the mainspring pre-tightening disc 8 with one (or two) tooling positioning shaft. When the rear cover 16 of the shell is assembled, the mainspring pre-tightening disc 8 is clamped by the rear cover 16, so as to keep the mainspring 4 pre-tightened. Meanwhile, compared with direct mounting of the mainspring 4 on the rear cover 16, the mounting of the mainspring 4 on the mainspring pre-tightening disc 8 has a much smaller blind area since the mainspring pre-tightening disc 8 is smaller than the wound mainspring, while the rear cover 16 is larger than the wound mainspring, thereby improving the assembly efficiency.

The capacitance-grating sensor 10A includes a transmitting board 10, a moving grating 11 and a receiving function board 12. The transmitting board 10, the moving grating 11 and the receiving function board 12 are sequentially located at positions of the central shaft 3 away from one end of the tape box 1 in a direction from the inside to the outside of the shell, and the transmitting board 10, the moving grating 11 and the receiving function 12 are disposed coaxial with the tape box 1. A second ball bearing 17 is disposed between the transmitting board 10 and the central shaft 3. The moving grating 11 is fixed on the central shaft 3 fixedly connected to the tape box 1. The receiving function board 12 is fixed on the inner wall of the front of the shell. The display screen 5 is mounted on the receiving function board 12, and the receiving function board 12 is further provided with the single-chip microcomputer 12A and buttons 13 which extend out of the shell and are configured to select a measuring mode. The capacitance-grating sensor is of a three-piece type structure formed by the transmitting board 10, the moving grating 11 and the receiving function board 12. Compared with the two-piece type capacitance-grating sensor, the distance between the boards is larger, so that the assembling difficulty is reduced and the production efficiency is improved.

Since the tape body 2 is wound around the outer circumference of the tape box 1 in a winding manner, the circumference of each circle wound by the tape body 2 is inconsistent, and the capacitance-grating sensor measures the rotation angle of the central shaft 3 and converts the rotation angle into the circumference, thereby achieving the length measurement. The above measurement principle will inevitably generate measurement errors in case of the conversion of linear proportion. In order to overcome the above technical problem, a general method is to use Archimedes's spiral for calculation. However, such algorithm requires that the tape body must be wound in a perfect spiral manner, which cannot be achieved in actual use, and is thus not conducive to promotion and application. In order to overcome the above deficiencies, the present invention is specifically improved as follows.

The capacitance-grating sensor measures a length value corresponding to the expansion of the tape body 2 at every N pitch angles in a factory calibration manner, and stores every N pitch angles of the capacitance-grating sensor and the expansion length values of the tape body 2 into the single-chip microcomputer in a form of one-to-one correspondence, so as to form an electronic digital scale of the tape body 2 in the single-chip microcomputer. During the measurement, the single-chip microcomputer reads out the length value corresponding to the angle value from the single-chip microcomputer in a table lookup manner according to the rotation angle of the capacitance-grating sensor, and the length value corresponding to the pitch angle smaller than N is calculated by the conversion of linear proportion, and two length values are combined to realize the measurement. The accuracy error introduced by the inconsistency in the winding circumference of each circle of the tape body can be overcome by the calibration in the above manner. The smaller the N value is, the higher the accuracy of the digital display measuring tape is.

Since the too large winding number of turns of the tape body will affect the measurement accuracy of the capacitance-grating type digital display measuring tape, the tape body of the capacitance-grating type digital display measuring tape is usually set to be short, while many measurement occasions require the measurement of a large range. In order to expand the measurement range of the digital display measuring tape, the measurement can also be performed by means of accumulation. The implementation manner of accumulative measurement is as follows.

When the first measurement is completed, the measurement button is operated, and the digital display measuring tape will regularly display first measurement data a1. At this point, the user operates the accumulative measurement button, and the product then enters an accumulative measurement mode. The zero position of the measuring tape will be updated as a1. In the next measurement, the measurements will be accumulated with a1 as a starting point. When the measurement is completed, the measurement button is pressed, and the digital display measuring tape will regularly display the accumulated measurement data a2 of two times.

Since the capacitance-grating sensor measures and counts angles by accumulating the number of angle pitches, if there is a problem with the zero return of the tape body, the correspondence relationship between the angle values measured by the capacitance-grating sensor and the electronic scale stored in the single-chip microcomputer in a manner of factory mark will be affected, and calculation errors will occur. For this reason, according to the characteristic that the angle value within the pitch of the single-chip microcomputer is unique, the present invention ensures the correspondence relationship between the angle values measured by the capacitance-grating sensor and the electronic scale stored in the single-chip microcomputer in the manner of factory mark by examining a zero-return self-checking function of the tape body. The specific operation is as follows: the single-chip microcomputer compares the angle value within the pitch of the capacitance-grating sensor at the current zero return position of the tape body 2 with the angle value within the pitch corresponding to the zero position of the tape body recorded when the factory initial position is calibrated, so that the self-checking function of determining whether the tape body 2 is returned to zero is realized, and the self-checking result is displayed on the display screen 5. When the tape body retracts but does not return to zero (for example loose winding of the tape body, internal curling of the tape body, and the like), the single-chip microcomputer detects the current position of the tape body, and compares the position with the zero position memorized by the single-chip microcomputer within the pitch at the initial position of the capacitance-grating sensor, and then whether the tape body is returned to zero can be determined. The error will be reported on the display screen 5 when the zero return of the tape body is failed. At this point, the user only needs to re-stretch and retract the tape body 2 until the tape body 2 is qualified for zero return and is ready for use.

The foregoing is only preferred embodiments of the present invention and is not intended to limit the present invention. Any modifications, equivalent replacements, improvements and the like made within the spirit and principle of the present invention shall be included in the protection range of the present invention.

We claim:

1. A capacitance-grating type digital display measuring tape, comprising:
   a shell,
   a tape box,
   a tape body,
   a capacitance-grating sensor, and
   a single-chip microcomputer,
   wherein a rotatable central shaft is disposed in the shell in an axial direction thereof;
   wherein the tape box is coaxially and fixedly connected to a position, corresponding to the back side in the shell, on the central shaft;
   wherein a mainspring configured to pre-tighten the tape box is disposed in the tape box;
   wherein the tape body is wound and collected in a groove in the outer circumference of the tape box, and one end of the tape body extends to the outside through an outlet in the side wall of the shell;
   wherein the capacitance-grating sensor is located in a position close to the front side in the shell, and the capacitance-grating sensor and the tape box are coaxially disposed to measure a rotation angle of the tape box;
   wherein the single-chip microcomputer is located on the capacitance-grating sensor and configured to obtain a measurement length of the tape body according to the rotation angle measured by the capacitance-grating sensor;
   wherein a display screen configured to display the measurement length obtained by the capacitance-grating sensor is disposed on the front of the shell; and
   wherein a moving grating of the capacitance-grating sensor is fixed on the central shaft fixedly connected to the tape box, and a self-adjusting mechanism configured to adjust a speed at which the tape body extends out of the shell or retracts into the shell is disposed at a position, corresponding to the outlet, on the inner wall of the shell.

2. The capacitance-grating type digital display measuring tape according to claim 1,
   wherein the capacitance-grating sensor measures a length value corresponding to the expansion of the tape body at every N pitch angles in a factory calibration manner, and stores every N pitch angles of the capacitance-grating sensor and the expansion length values of the tape body into the single-chip microcomputer in a form of one-to-one correspondence, so as to form an electronic digital scale of the tape body in the single-chip microcomputer.

3. The capacitance-grating type digital display measuring tape according to claim 2,
wherein the single-chip microcomputer compares a memory of a zero position within an initial position pitch of the capacitance-grating sensor with a current position of the tape body, to detect whether the tape body is returned to zero, and displays a detection result by the display screen.

4. The capacitance-grating type digital display measuring tape according to claim 1,
wherein the self-adjusting mechanism comprises a rotary pin and a speed limiting rod;
wherein the rotary pin is located in a corresponding position on the inner wall of the shell;
wherein the middle portion of the speed limiting rod is rotatably mounted on the rotary pin; and
wherein one end of the speed limiting rod abuts against the outer periphery of the tape box, and the other end of the speed limiting rod extends obliquely and then abuts against a portion of the tape body between the tape box and the outlet.

5. The capacitance-grating type digital display measuring tape according to claim 1, further comprising:
a mainspring pre-tightening disc which rotates to pre-tighten the tape box by the mainspring during assembling of the measuring tape,
wherein the mainspring pre-tightening disc is located at a position, corresponding to the inside of the tape box, on the end portion of the central shaft;
wherein the mainspring is located between the mainspring pre-tightening disc and the tape box;
wherein one end of the mainspring is fixed on the outer periphery of the mainspring pre-tightening disc, and the other end of the mainspring is fixed on the inner periphery of the tape box; and
wherein the mainspring pre-tightening disc is further provided with a reserved hole for positioning the mainspring pre-tightening disc after the tape box is pre-tightened by the mainspring.

6. The capacitance-grating type digital display measuring tape according to claim 5, wherein a first ball bearing is disposed between the mainspring pre-tightening disc and the end portion of the central shaft.

7. The capacitance-grating type digital display measuring tape according to claim 1,
wherein the capacitance-grating sensor further comprises a transmitting board and a receiving function board;
wherein the transmitting board, the moving grating and the receiving function board are sequentially located at positions of the central shaft away from one end of the tape box in a direction from the inside to the outside of the shell, and the transmitting board, the moving grating and the receiving function are disposed coaxial with the tape box;
wherein a second ball bearing is disposed between the transmitting board and the central shaft;
wherein the moving grating is fixed on the central shaft and rotates synchronously with the central shaft;
wherein the receiving function board is fixed on the inner wall of the front of the shell;
wherein the display screen is mounted on the receiving function board; and
wherein the receiving function board is further provided with the single-chip microcomputer and buttons which extend out of the shell and are configured to select a measuring mode.

8. The capacitance-grating type digital display measuring tape according to claim 7, wherein the buttons comprise an accumulative measurement button, and the accumulative measurement button controls the next measurement by the single-chip microcomputer and takes the last measurement as a starting point to accumulate multiple measurements and obtain a measured value.

9. The capacitance-grating type digital display measuring tape according to claim 1,
wherein the shell comprises a front cover, a support seat, and a rear cover;
wherein the front cover and the rear cover are disposed front and back at an interval; and
wherein the support seat is located between the front cover and the rear cover and connects the two.

10. The capacitance-grating type digital display measuring tape according to claim 1, wherein the tape body is a steel tape, a PVC plastic fiber tape or a flexible wire tape.

* * * * *